(12) United States Patent
McCarthy (10) Patent No.: US 9,201,848 B2
(45) Date of Patent: Dec. 1, 2015

(54) FLOATING POINT MATRIX MULTIPLICATION CO-PROCESSOR

(71) Applicant: Daniel McCarthy, Manlius, NY (US)

(72) Inventor: Daniel McCarthy, Manlius, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 537 days.

(21) Appl. No.: 13/694,854

(22) Filed: Dec. 12, 2012

(65) Prior Publication Data

US 2014/0032625 A1 Jan. 30, 2014

Related U.S. Application Data

(60) Provisional application No. 61/742,059, filed on Jul. 27, 2012.

(51) Int. Cl.
*G06F 17/16* (2006.01)

(52) U.S. Cl.
CPC ..................................... *G06F 17/16* (2013.01)

(58) Field of Classification Search
None
See application file for complete search history.

(56) References Cited

U.S. PATENT DOCUMENTS

| | | | |
|---|---|---|---|
| 8,577,951 B1* | 11/2013 | Langhammer | 708/607 |
| 8,984,043 B2* | 3/2015 | Ginzburg et al. | 708/607 |
| 2009/0024685 A1* | 1/2009 | Salama et al. | 708/607 |
| 2014/0032625 A1* | 1/2014 | McCarthy | 708/607 |

* cited by examiner

*Primary Examiner* — David H Malzahn
(74) *Attorney, Agent, or Firm* — Joseph A. Mancini (57) ABSTRACT

Invention providing a means for performing matrix multiplication that may be implemented in hardware or software. The invention is scalable to matrices of varying dimension and to permit balancing circuit complexity versus processing throughput.

5 Claims, 9 Drawing Sheets

Equation 1 :

$$P_{r,c} = (AB)_{r,c} = \sum_{k=1}^{p} A_{rk} B_{kc}$$

Block Diagram

Device Utilization Summary xc6slx45t-3fgg484

| Logic Utilization | Used | Available | Utilization |
|---|---|---|---|
| Slice Registers | 17326 | 54576 | %31 |
| Slice LUTs | 15520 | 27288 | %56 |
| Block RAM/FIFO | 18 | 116 | %15 |
| Number of DSP48A1s | 16 | 58 | %27 |

*Figure 9*

FLOATING POINT MATRIX MULTIPLICATION CO-PROCESSOR

PRIORITY CLAIM UNDER 35 U.S.C. §119(e)

This patent application claims the priority benefit of the filing date of provisional application Ser. No. 61/742,059, having been filed in the United States Patent and Trademark Office on Jul. 27, 2012 and now incorporated by reference herein.

STATEMENT OF GOVERNMENT INTEREST

The invention described herein may be manufactured and used by or for the Government for governmental purposes without the payment of any royalty thereon.

BACKGROUND OF THE INVENTION

Figure 1:
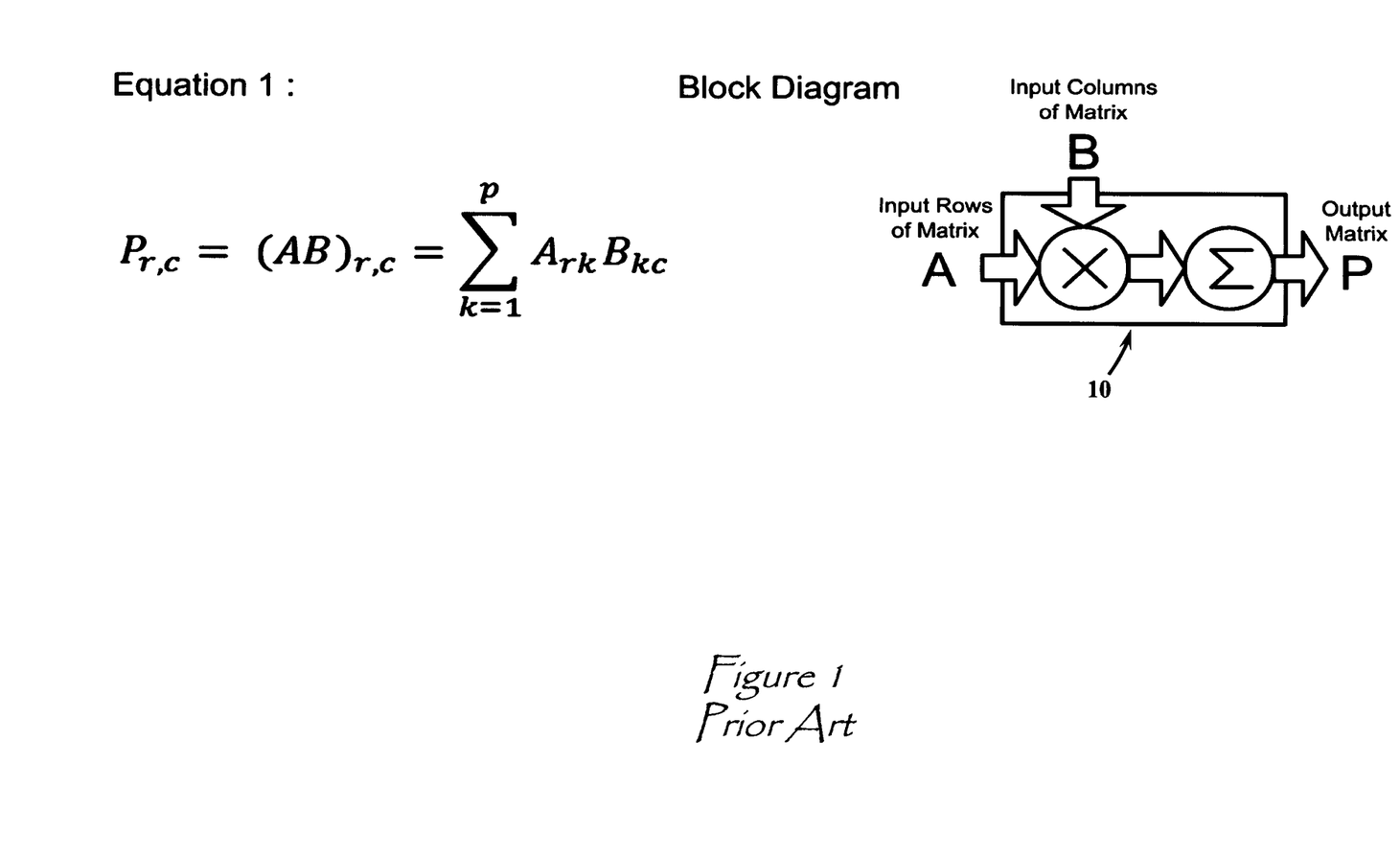
FIG. 1 depicts a prior art matrix multiplication summation equation and hardware implementation block diagram.

The matrix multiplication of two matrices can be defined when the number of the columns of the first matrix matches the number of the rows of the second matrix. The resultant product matrix size is rows of the first matrix by the columns of the second. The elements of the product matrix are calculated by multiplying the elements or (terms) within a row from the first matrix by the associated elements within a column from the second matrix and summing the products. FIG. 1 shows the prior art summation equation of a product matrix (P) of an n×p matrix A with a p×m matrix B, where $1 \leq r \leq n$ is the row index and $1 \leq c \leq m$ is the column index. The block diagram 10 is a term-parallel hardware implementation of Equation 1 depicted.

Figure 2:
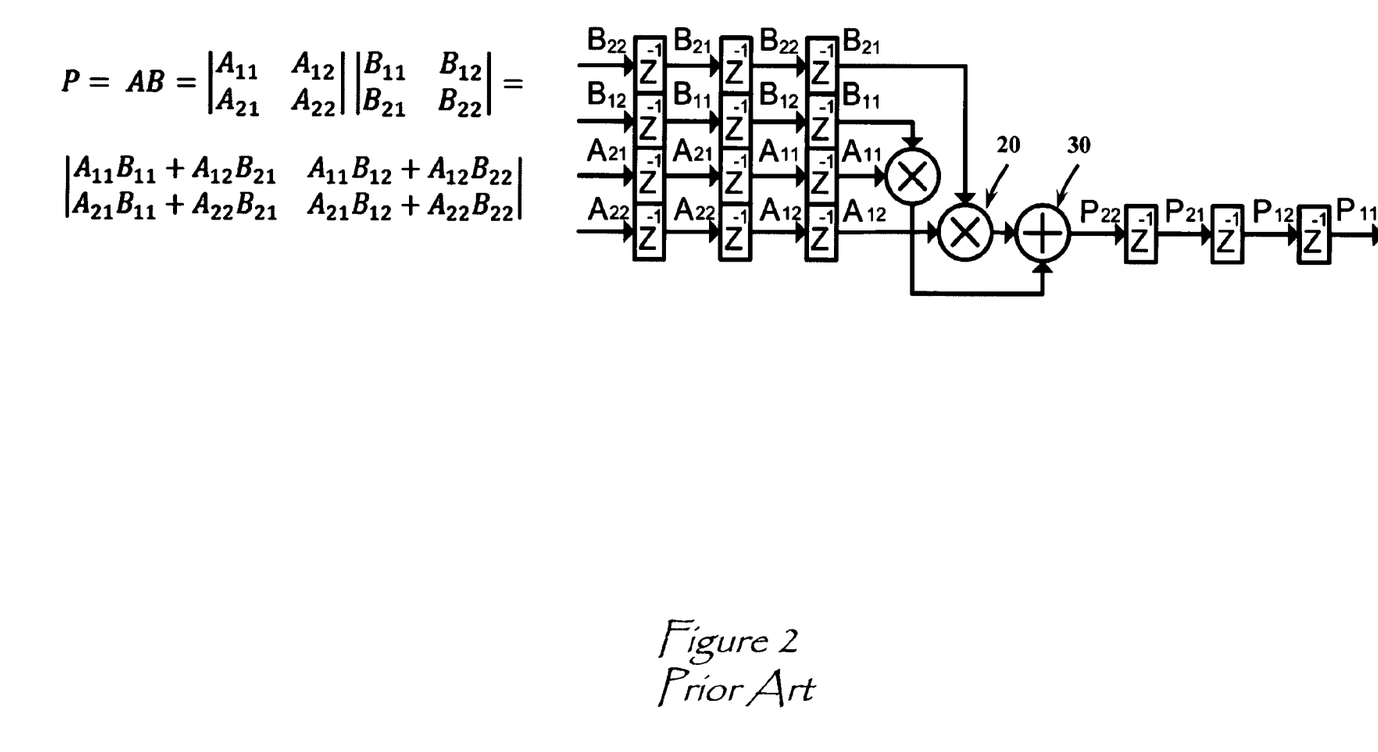
FIG. 2 depicts a prior art term-parallel hardware implementation of a two by two matrix multiply.

A prior art term-parallel hardware implementation of a two by two matrix multiply is shown in FIG. 2. The block diagram shows how the elements of each term are fed in parallel to pipelined multiplier 20 and adder 30 arrays. The diagram shows how the data is clocked through the system.

OBJECTS AND SUMMARY OF THE INVENTION

The purpose of the present invention is to provide a floating point matrix multiplication co-processor that is platform-independent.

One object of the present invention is to provide a matrix multiplication co-processor means that is scalable to accommodate matrices of any dimension.

Another object of the present invention is to provide a matrix multiplication co-processor means that has the option for trading processing speed for reduced complexity.

Still another object of the present invention is to provide a matrix multiplication co-processor means that is portable to field programmable gate array (FPGA), application specific integrated circuit (ASIC), or system on chip (SoC) implementations.

Briefly stated, the present invention provides a means for performing matrix multiplication that may be implemented in hardware or software. The invention is scalable to matrices of varying dimension and to permit balancing circuit complexity versus processing throughput.

DETAILED DESCRIPTION OF THE PREFERRED EMBODIMENT

Figure 3:
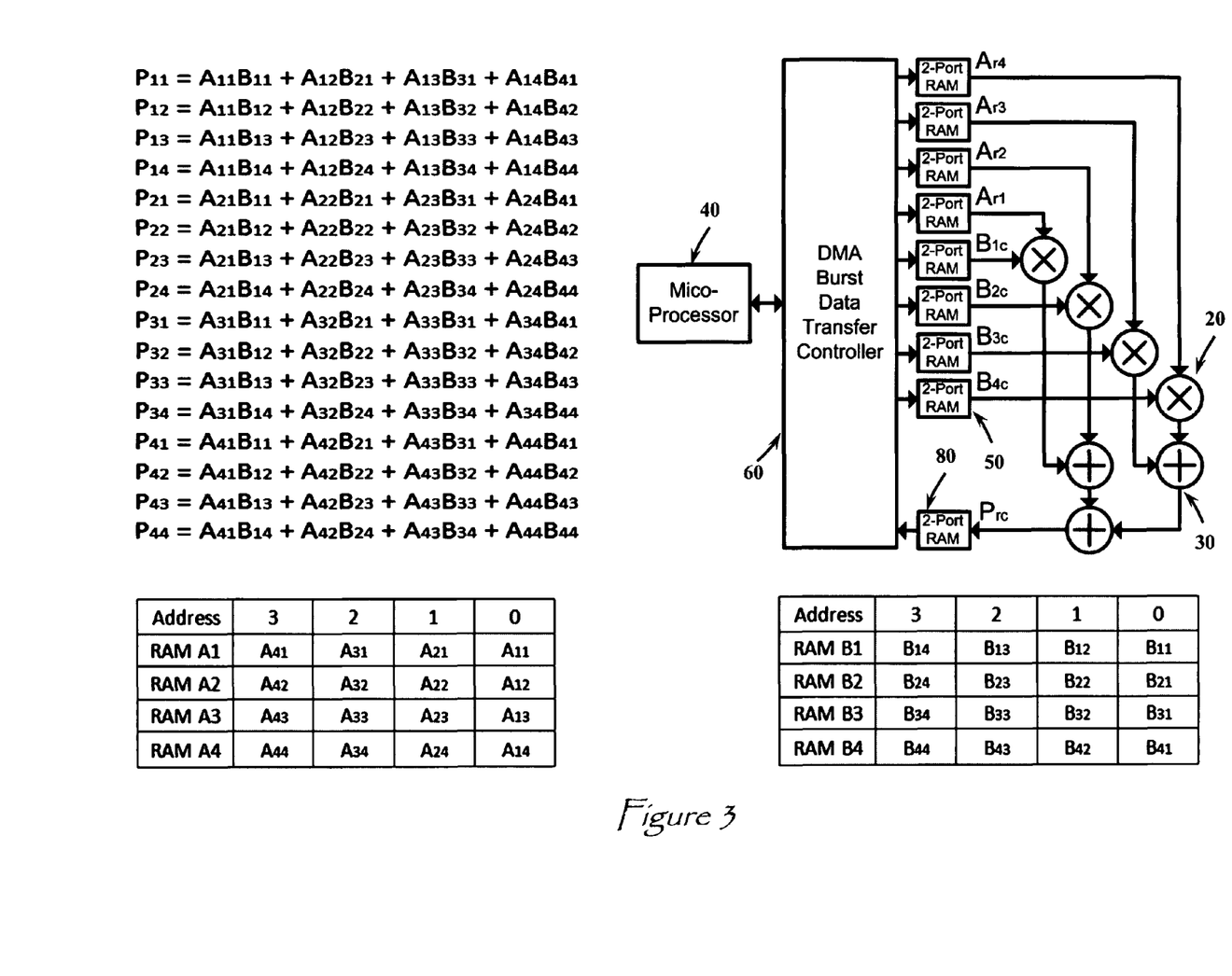
FIG. 3 depicts the present invention's four by four system that uses a bank of dual port clocked Random Access Memory (RAM) to feed the parallel clocked multiplication array.

Referring to FIG. 3 shows a four by four system that uses a bank of dual port clocked Random Access Memory (RAM) 50 to feed the parallel clocked multiplication array or "multipliers" 20 followed by a parallel clocked product term addition array or "adders" 30. The microprocessor or Central Processing Unit (CPU) 40 loads each column of the A matrix into an A row RAM, each row of the B matrix is loaded into a B column RAM. The bottom two tables show the RAM address where each A and B data element is written to. The data is read out of the RAMs in a manner to parallel feed the multiplier array, to sequentially create each term of the product matrix. Each of the A and B columns of the product matrix table represent the per clock cycle parallel data read from each RAM into the four multipliers. To achieve this, the first element address of the A RAMs is held for four clock cycles while the B RAMs count through all four addresses. This feeds the first four terms to the array producing the first row (P11 P12 P13 P14) of the product matrix. This is repeated for each A RAM element address to form each row of the product matrix. The dual-port RAM is also used to store the product matrix. The dual-port RAM allows a microprocessor or central Processing Unit (CPU) that supports Direct Memory Access (DMA) 60 block data transfer to rapidly load the array processor and retrieve the result. The figure shows the basic nature of the invention.

Still referring to FIG. 3, it is apparent that the resources required to construct a singled-valued, non-complex N×N term parallel array co-processor for a given FPGA, ASIC or, SoC platform can be calculated. From the figure we can see it takes N multipliers 20, N−1 adders 30 and 2N+1 block RAMS 50 to implement a fully parallel N×N array. A Hardware Description Language (HDL) code can be written to generate the array or use a configuration script to automatically generate the HDL array code. The DMA HDL code to load and unload the RAMs 50 is easily generated and is described below. The front end DMA code will depend on the platform bus chosen; common examples are peripheral Component Interconnect (PCI), or Advanced Microcontroller Bus Architecture (AMBA) variants. The pipeline multipliers 20, adders 30 and block RAM 50, can be written in HDL or HDL wrapped Intellectual Property (IP) cores depending on the implementation platform chosen. Of course, it is within the scope of the present invention that they may likewise be implemented in hardware as well as HDL or other software means.

Figure 4:
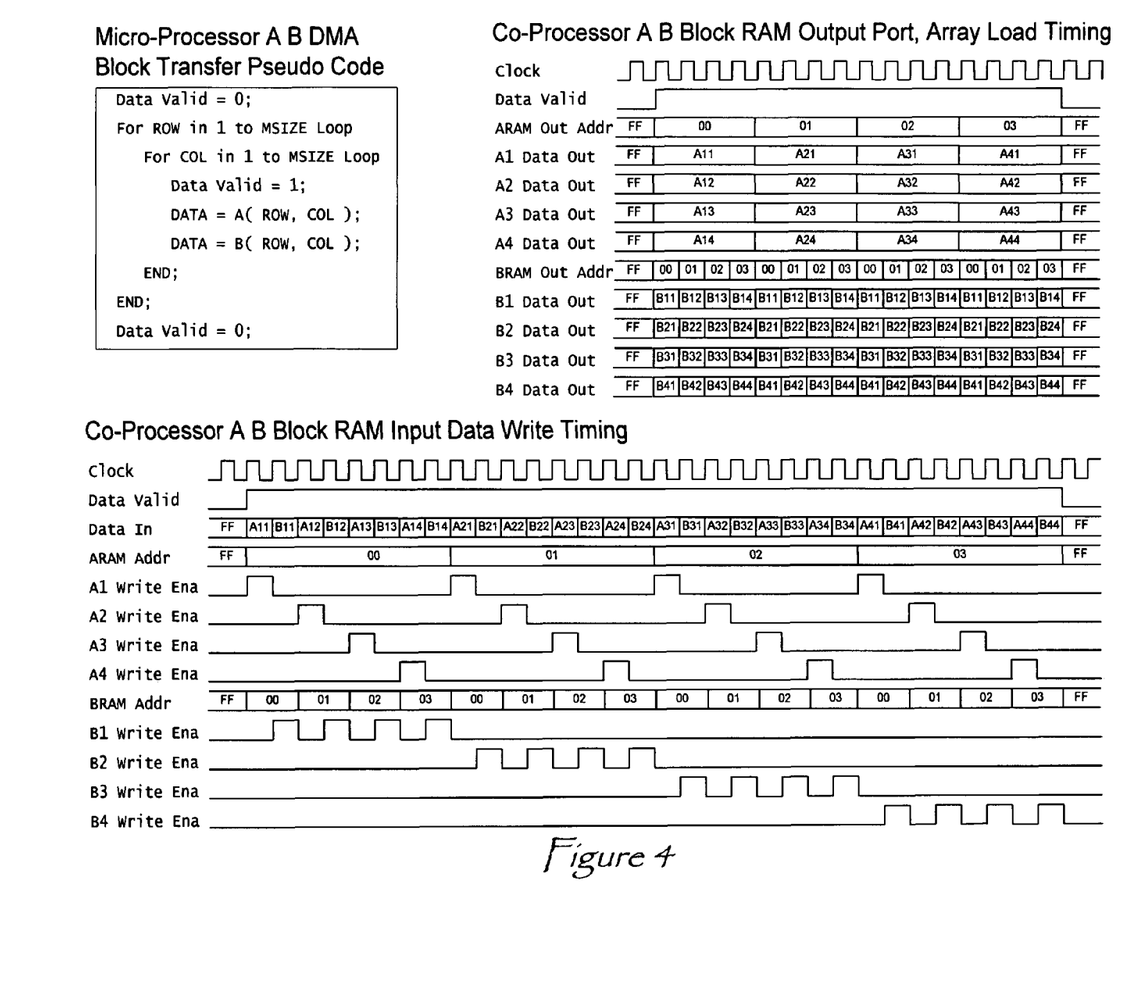
FIG. 4 depicts a pseudo code to block transfer the A and B matrices from the microprocessor to the co-processor and the timing diagram required for the HDL to write the DMA input data to the A and B RAMS.

Referring to FIG. 4, if the microprocessor uses a simple scheme to DMA block transfer the A and B matrices to the co-processor, then an HDL code for the transfer controller that writes the data into the A and B block RAM input ports can be developed. FIG. 4 shows a simple pseudo code to block transfer the A and B matrices from the microprocessor to the co-processor and the timing diagram required for the HDL to write the DMA input data to the A and B RAMS. The timing required to read the block ram output ports to load the multiplier array is also shown.

Still referring to FIG. 4, in the co-processor A B block RAM input data write timing diagram the data valid signal comes from the microprocessor bus to the input ports of the dual-port RAMs. The co-processor uses the signal to qualify the input data. The form of the data valid will depend on the bus used. There will also be co-processor setup and acknowledge registers required depending on the bus specification. A continuous data valid is not required but is preferred if possible since it represents the fastest method to transfer the data to the coprocessor. The clock in the input data write diagram is the bus master clock. If the co-processor dual-port RAM cannot accept input data at the bus transfer clock then wait states must be generated to hold each data word for multiple clocks allowing time for the RAM write operation to occur. No wait state RAM is preferred for highest data transfer bandwidth.

In the array load timing diagram the data valid signal is generated internally by the co-processor. The signal is used to enable dual-port RAM output data and qualify the data at the input to the multiplication array. The data valid single is fed into and clocked through the multiplication array along with the data. Data valid propagates through the multiplication and addition array and is used to qualify valid output data to be written into the output product RAM. Data valid need not be continuous as shown in the diagram. The clock signal in the array load timing diagram can be internally generated by the co-processor asynchronously from the bus clock, or it can be the bus clock or a synchronous multiple of the bus clock.

The DMA scheme used to read the output product RAM will be bus dependent and similar to the scheme used to write the A B input. The microprocessor can poll for data reading elements of the product matrix as soon as they become available or wait until the entire product matrix is available and block transfer the data.

Figure 5:
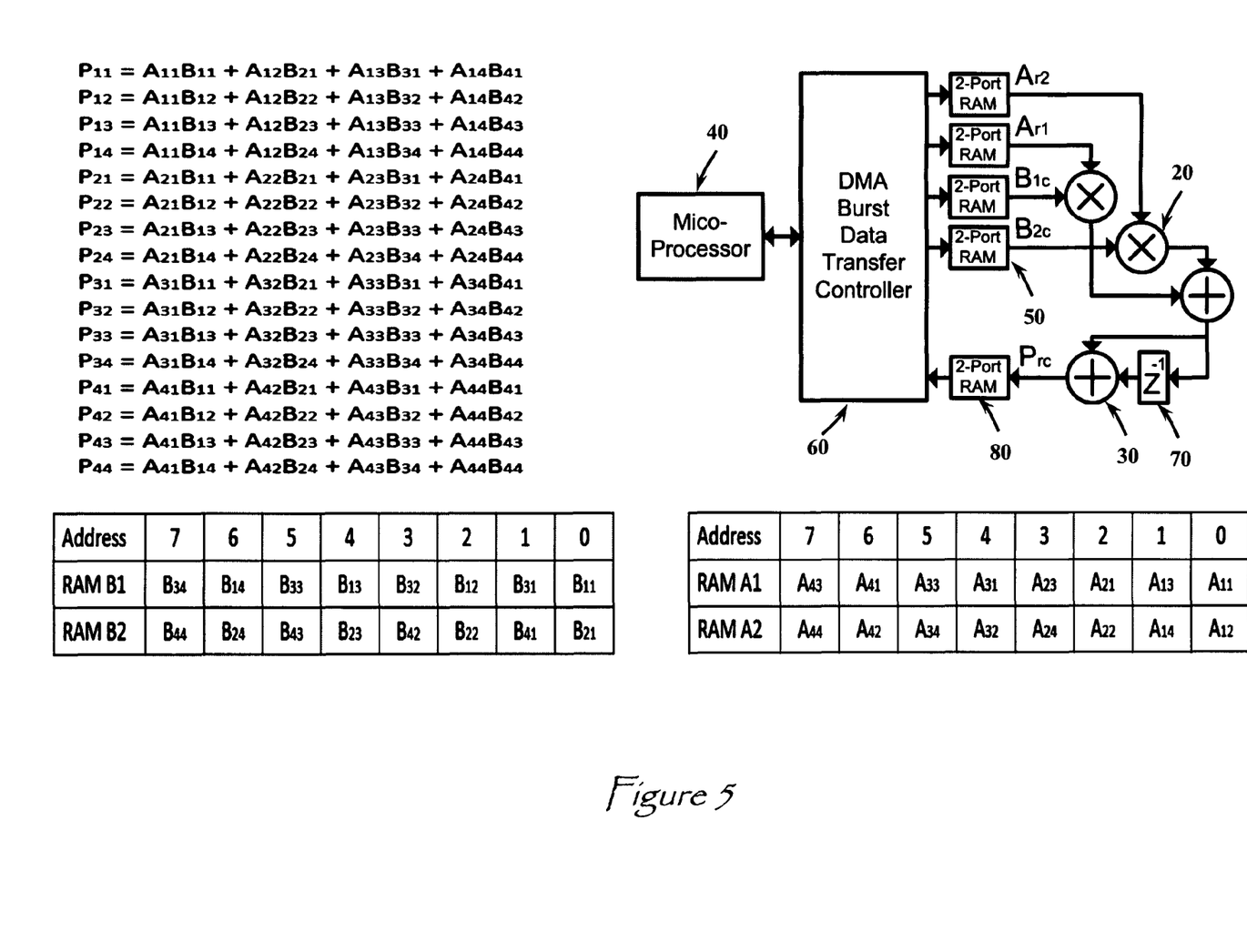
FIG. 5 depicts an example of how a four by four matrix is processed by a scalable two by two co-processor.

Referring to FIG. 5, the ability to scale the co-processor to process matrices that are larger than the size of the co-processor array is an important feature of the invention. FIG. 5 shows an example of how a four by four matrix is processed by a two by two co-processor.

If we compare FIG. 3 and FIG. 5 the present invention has reduced the number of parallel multipliers 20 required by a factor of two at the cost of doubling the amount of time required to process the matrix. The total size of the RAM 50 required remains unchanged; we have moved the contents of RAM 3 into RAM 1 and the contents of RAM 4 into RAM 2. This allows us to calculate each term of the product matrix in two steps as opposed to one. In step one we multiply the first two product terms and store the summation in the delay register, ($z^{-1}$) 70 in FIG. 5. In step two we calculate the second half of the equation and add it to the contents of the delay register 70. The output of the summation is then stored in the output product RAM 80. We now produce product terms on every other clock as opposed to on every clock cycle with a full size array.

Still referring to FIG. 5 depicts a scalable matrix multiplication co-processor configured for the multiplication of two 2×2, or two 4×4 matrices. The co-processor is comprised of a DMA Burst Data Transfer Controller 60, a plurality of random access memory (RAM) banks 50, a plurality of clocked pipeline multiply 20, adder 30 and delay register 70 elements, and a pipeline control circuit (not shown in figure). The microprocessor 40 would use this co-processor to perform matrix multiplications of 2×2 or 4×4 matrices, rather than using a conventional software subroutine to perform these tasks. This is not a practical matric size for implementation, it is used here to illustrate the matrix size scalability of the co-processor. FIG. 5 depicts the present invention scaled for 4×4 operation. The DMA Burst Controller 60 operates with the microprocessor 40 to transfer data to and from the microprocessors RAM banks to and from the co-processors plurality of RAM banks 50. The transfer controller 60 loads data from the microprocessor RAM to the co-processor input A and B RAMs 50 in the manor shown in the A and B ram tables. This allows the four multiplications required per 4×4 product term, shown in the product term table list, to be presented to the two multipliers 20 in two stages. For the first product term, P11, in stage one the sub product A11B11 plus A12B21 is calculated and stored in the D latch delay element 70, (depicted as Z to the minus one), in stage two the second sub product A13B31 plus A14BB41 is calculated and added to the stored stage one sub product to form the full P11 product term which is then written into the output product RAM 80. This process is repeated to calculate the remaining fifteen product terms. For 2×2 operation (not shown) the pipeline controller would bypass the final delay element 70 and add stage, and load the output RAM 80 directly, the DMA controller 60 would load the input rams 50 accordingly for 2×2 matrix operation. The aggregate clock rate for loading the output RAM 80 for 4×4 operation is ½ the rate of 2×2 operation. This process can be recursively scaled up or down in the coprocessor to accommodate matrix sizes greater or less than the number of parallel input RAM/Multiplier banks 50 built into a given co-processor design. Software code may be used to program the microprocessor to accomplish the scaling, including setting a scaling factor m, computing the ratio of matrix size n to scaling factor m, and setting and decrementing a counter function.

Figure 6:
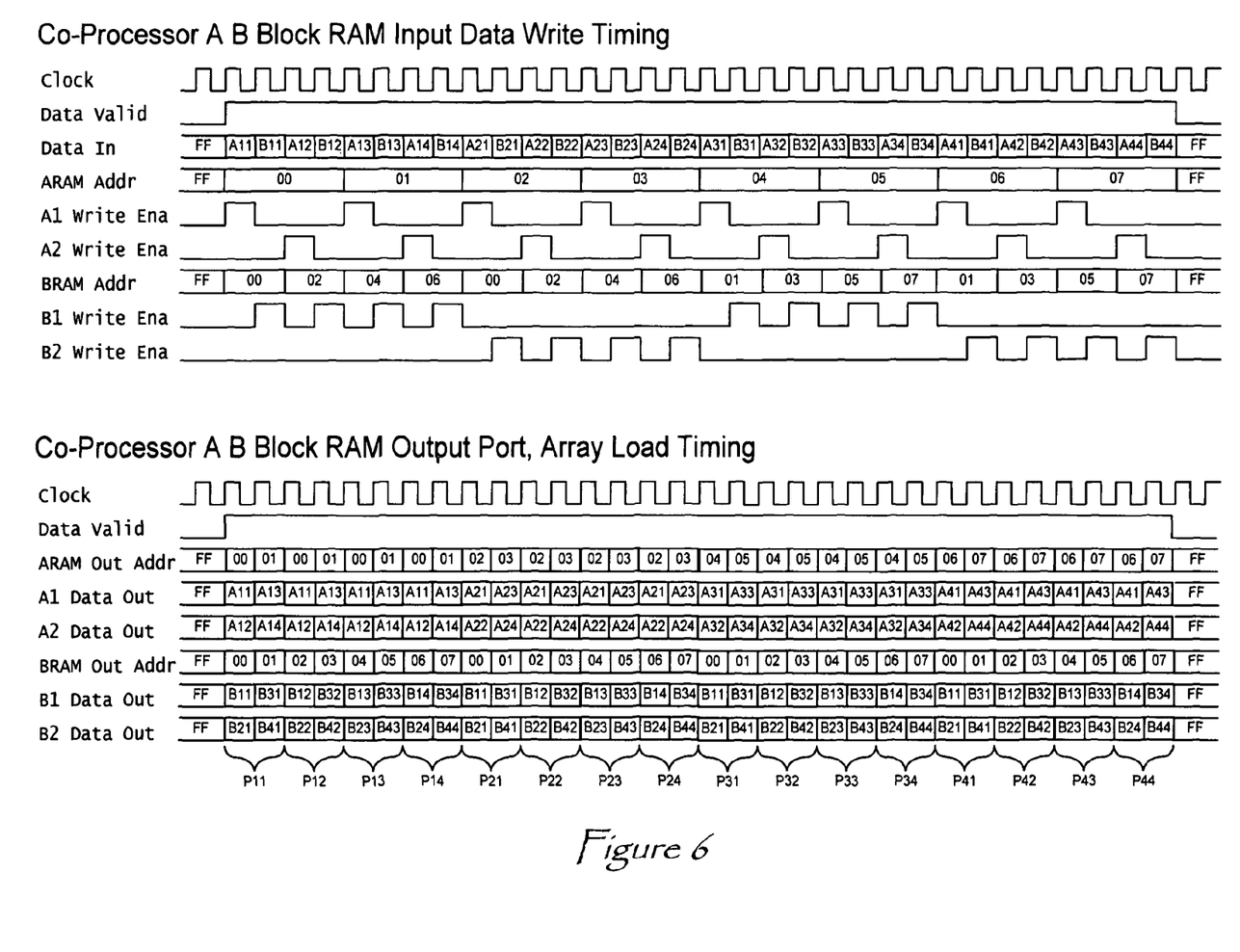
FIG. 6 depicts a timing diagram for a two by two to four by four scaling embodiment of the present invention.

Referring to FIG. 6 shows the timing diagrams to load and read the input block RAMs for a two by two array processing a four by four matrix.

If we restrict the scaling to power-of-two square-matrices we can easily recursively apply the scaling. For instance we could apply the same principle to the four by four implementation in FIG. 3 to produce an eight by eight product matrix at one half the clock rate, or we could scale the two by two co-processor in FIG. 5 two times to produce an eight by eight product matrix at one quarter the clock rate.

For non-power of two matrix sizes and non-square matrices, we find the smallest power-of-two-square matrix that contains our desired matrix, and configure the co-processor to automatically zero out the unused elements. This reduces the DMA requirement bandwidth since we do not need to transmit and receive the zeroed elements.

We can recursively apply the principles shown in this two to four scaling example to our HDL control design allowing the co-processor to be parameter configurable to support a range of matrix sizes at a desired scale factor. The ability to scale the array processor allows the co-processor to be more generic in nature, supporting a much larger and more versatile design tradeoff trade-space.

Figure 7:
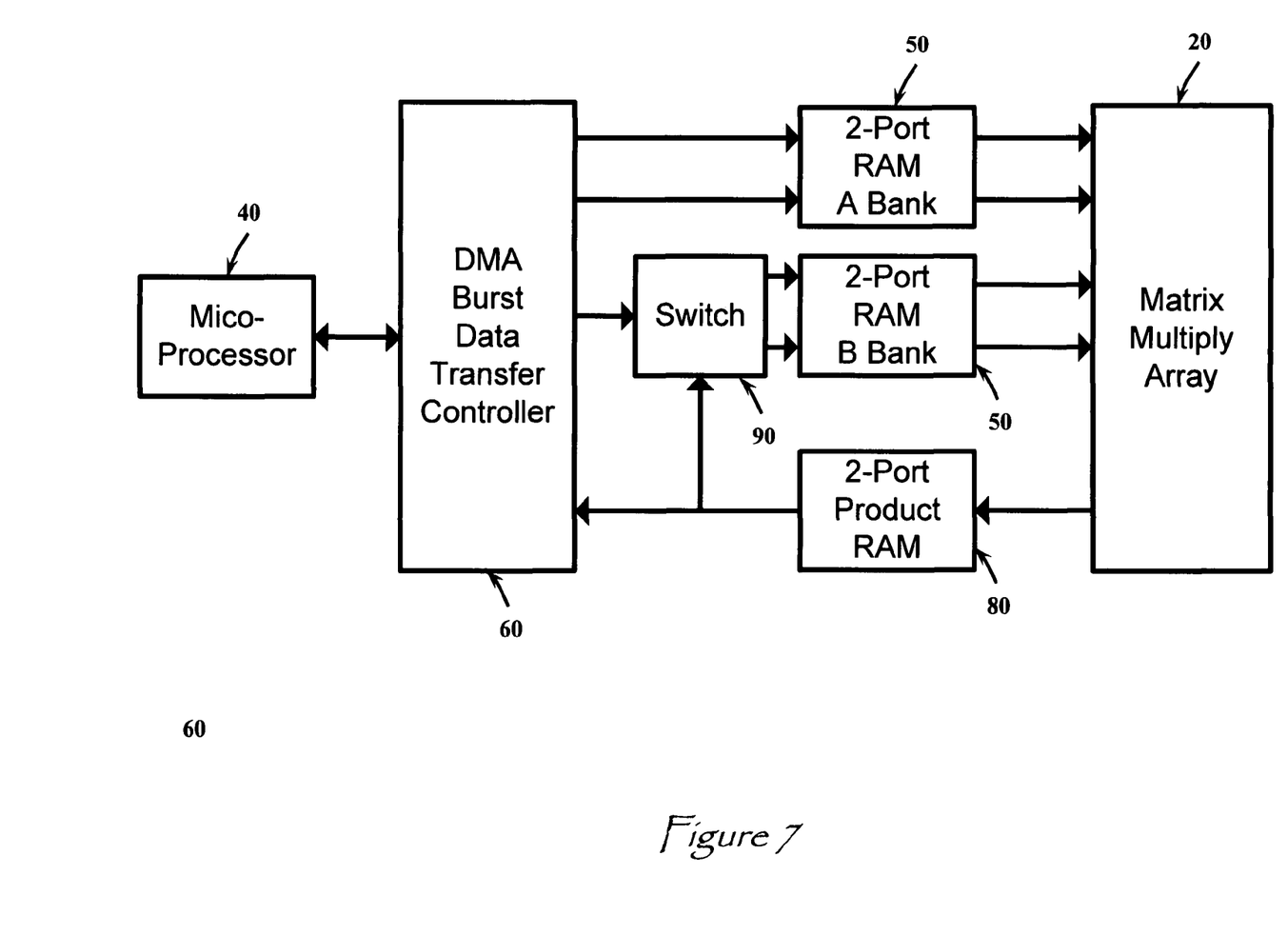
FIG. 7 depicts a multiple matrix feedback switch.

Referring to FIG. 7, the description of the present invention to this point described a co-processor that performs a single matrix multiply P=A*B. The present invention adds a feedback path to the co-processor to more rapidly multiply several matrixes, such as P=A*B*C*D. To perform the operation D is loaded into the B RAM bank 50, A B and C are loaded into the A RAM bank 50. The product P=C*D is fed back through the switch 90 and written back into the B RAM, this process is repeated two more times to form the final product. This option reduces the Micro-processor bus bandwidth required to perform the series of matrix multiplications at the cost of more A RAM.

Figure 8:
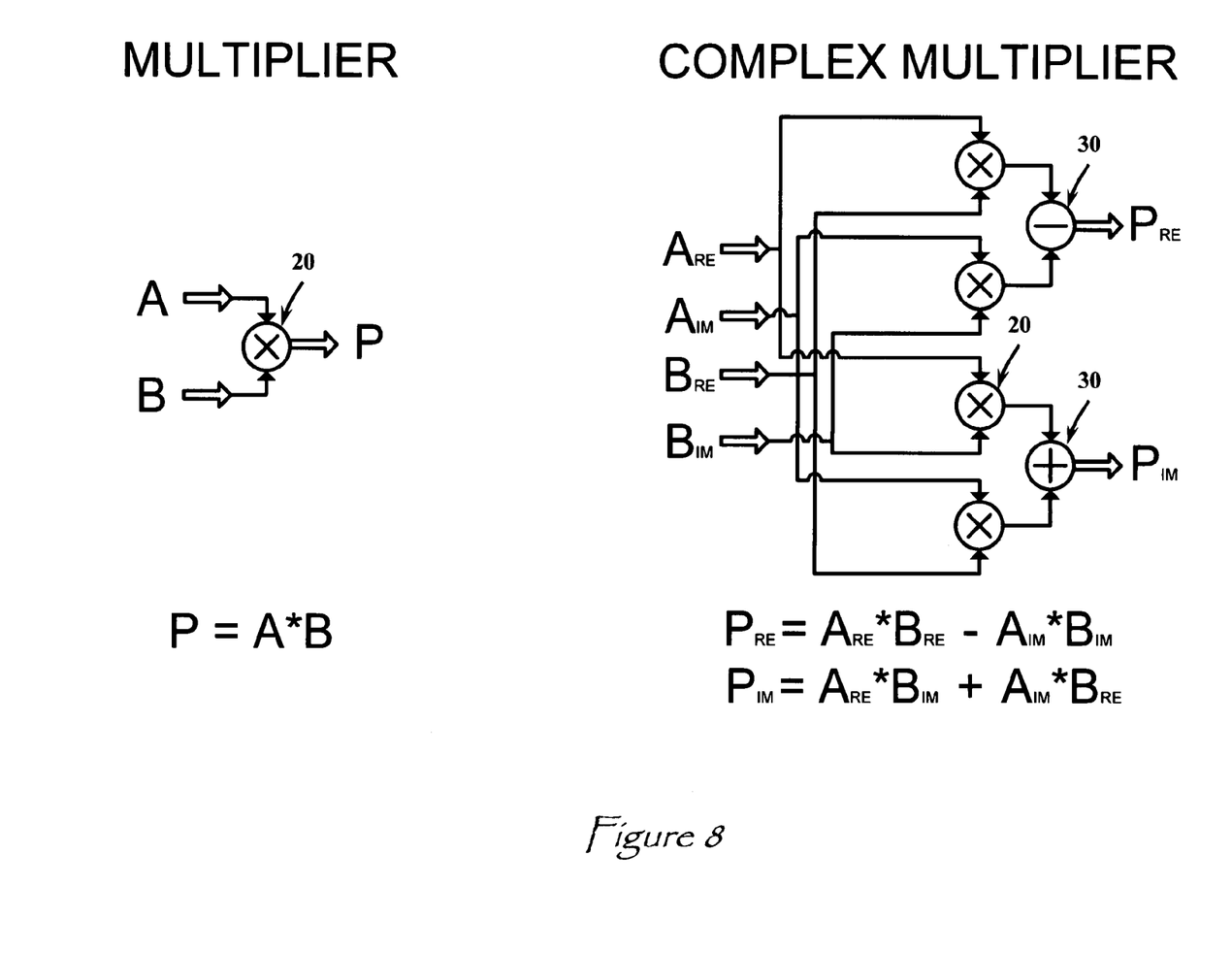
FIG. 8 depicts the circuits for multiplication and complex multiplication.

Referring to FIG. 8, the co-processor to can be scaled to process complex-valued data by using simple firmware HDL substitution and shows the circuits for multiplication and complex multiplication.

For complex multiplication each multiplier 20 in the array is replaced with a complex multiplier. Each adder 30 in the array is replaced with a pair of adders, one for the real and one for the imaginary component. The amount of block RAM required is also doubled. If the same DMA block transfer scheme where the invention transfers $A_{RE}$ $A_{IM}$ $B_{RE}$ $B_{IM}$ then the invention will have to adjust the DMA HDL accordingly. Specifically, for a complex valued matrix the resource calculation would be 4N multipliers 20, 2(N−1)+2N adders 30, (one of the two is subtraction) and 2(2n+1) block RAMs 50.

The present invention permits scaling the co-processor for floating point precision. The co-processor design is based on using IEEE 754, standard single precision, 32-bit, or 64-bit double precision floating point pipelined multiplier IP core or HDL based multipliers and adders. The DMA burst data bus should be the same data width as the multipliers and adders. The present invention design can support any custom precision required. If the bus width matches the multiplier and adder width the design remains basically unchanged. If the bus width does not match the multiplier the DMA HDL to read and write to the coprocessor must be modified accordingly.

Optimization of the pipeline. The timing constraints in the design of the present invention are the read and write access times of the RAM 50. Ideally the RAM should be fast enough to support the full bus burst data transfer rate with zero wait states. On the array side of the RAM 50 the maximum pipeline clock rate is the slowest clock rate of the RAM, the multiplier, or the adder. Pipelining of the multipliers 20 and adders 30 is accomplished by breaking the carry chain and inserting data width flip-flops at strategic locations. Additional pipeline stages are added to achieve higher throughput clock rates at the expense of device clock latency. The amount of pipeline control over the multiplier and adder models will determine the pipeline tradeoff trade space. Another design variable available to increase clock speed is to use multi-buffered RAM to achieve faster RAM access times.

Prototyping and Testing of the Invention

Figure 9:
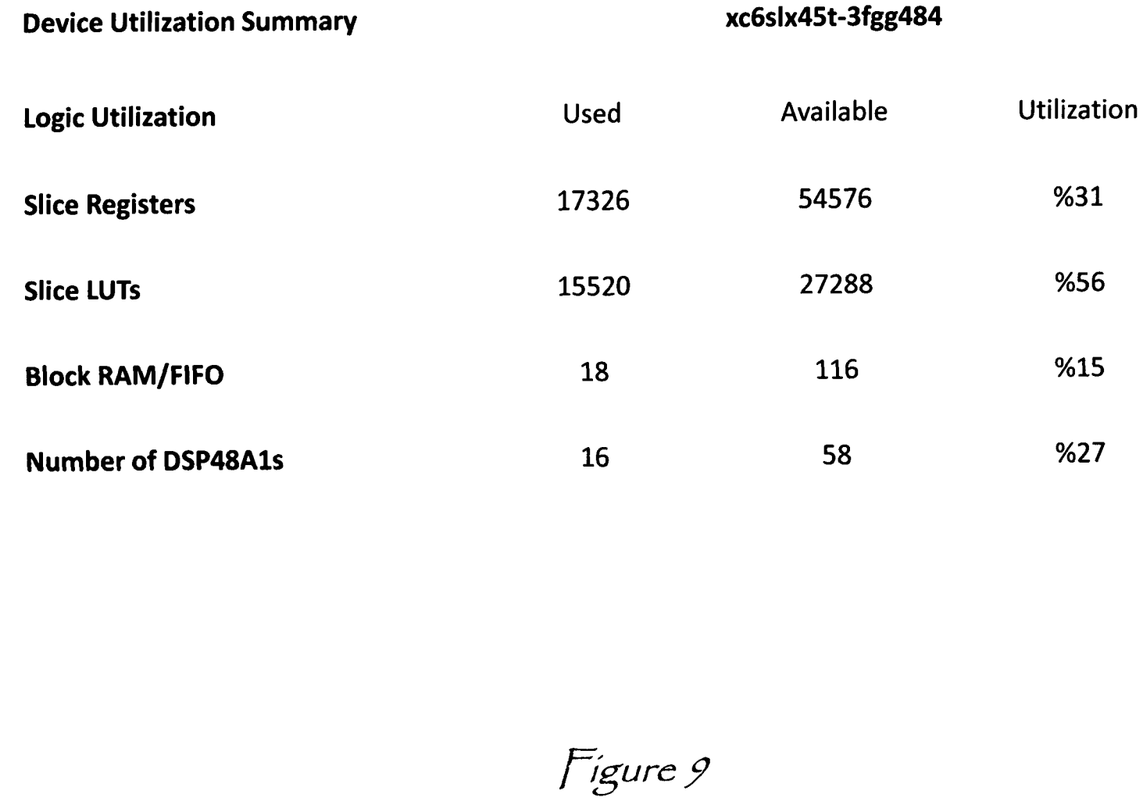
FIG. 9 depicts a co-processor FPGA synthesis summary of a Xilinx Spartan6 xc6slx45t-3fgg484 FPGA on a SP605 demonstration board platform. The design is a four by four term-array multiplier scaled to process eight by eight IEEE 754 standard single precision 32-bit complex-valued A and B matrices.

To date the present invention comprises a VHDL version of the co-processor targeting a Xilinx Spartan6 xc6slx45t-3fgg484 FPGA on a SP605 demonstration board platform. The design of the present embodiment of the invention is a four by four term-array multiplier scaled to process eight by eight IEEE 754 standard single precision 32-bit complex-valued A and B matrices. The block RAM 50 is generated using the Xilinx Logicore Block Memory Generator, configured for the simple native memory interface. The floating point multipliers 20 and adders 30 are constructed using the Xilinx Logicore Floating Point 6.0 Generator. No pipeline optimization was considered on the multiplier 20 and adder 30 implementations, both were configured for maximum latency and maximum clock speed. The design uses a common clock for both the CPU and array sides of the RAMs 50. The maximum synthesis estimated clock frequency is 191 megahertz. FIG. 9 shows the co-processor FPGA synthesis summary.

To process a four by four complex-valued matrix the present invention requires 64 clocks to transfer A and B, 16 clocks plus 46 pipeline latency clocks to process the matrix, and 32 clocks to read the output. For the eight by eight the respective numbers are 256, 64+59, and 128 . Ignoring register setup and status reading it takes 158 clock cycles to process the four by four and 507 clock cycles to process the eight by eight. For the four by four at a target frequency of 66 megahertz this is approximately 2.4 microseconds. At the maximum synthesizable clock rate of 191 megahertz the time is 0.8 microseconds. For the eight by eight the times are 7.7 microseconds and 2.7 microseconds.

The co-processor design was verified using the Xilinx ISim HDL simulator. A VHDL test bench was written to simulate a MicroBlaze 32-bit RISC soft processor core using an AXI4 32-bit inter-connect bus. Burst IEEE 754 standard single precision 32-bit complex-valued data was sent to and from the co-processor in the manner described earlier. The co-processor was tested in both eight by eight and four by four matrix configurations.

For debugging purposes the A matrix elements were their respective hexadecimal addresses as shown in the figures. The identity matrix was used as the B matrix. This allows the data to be easily tracked through the co-processor pipeline stages. This was repeated using the identity matrix in A with the B address matrix.

To completely verify the co-processor Matlab was used to generate random complex-valued A and B matrices and calculate the product matrix P. The A, B, and P matrices were written to text files that were read by the VHDL test bench. The output of the coprocessor was read by the test bench and compared to the Matlab results.

Plans for the invention include integrating the co-processor into an existing MicroBlaze design and compare the performance of the coprocessor to a standard floating point enhanced processor running a C language based matrix multiply. Following that features to rapidly process four sequential matrix multiplies will be added. Also, the co-processor will be implemented as an ARM9 external add on FPGA based co-processor.

While some of today's FPGA and SoC development platforms offer manual, automatic and semi-automatic methods for co-processor development this invention provides a method to design a generic HDL based floating point matrix multiplication co-processor that is not tied to a specific platform or platform tool. This method gives the designer the ability to scale any and all of the design parameters including the ability to scale to fixed point formats.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A matrix multiplication co-processor for multiplying a plurality of n matrices, wherein n is an integer number denoting a quantity of said matrices, comprising:
    a microprocessor;
    a data transfer controller;
    a switch;

a plurality of random access memory (RAM) banks, said plurality further comprising matrix row banks, matrix colon banks, and matrix product banks; and a matrix multiply array;
  wherein said microprocessor loads data from its RAM into said data transfer controller;
wherein said data transfer controller:
  loads an nth matrix into said matrix column bank;
  loads an (n−1)th matrix into said matrix row bank;
wherein said matrix multiply array
  multiplies said nth matrix by said (n−1)th matrix to form an interim product;
wherein said switch writes said interim product into said matrix product bank;
wherein said microprocessor decrements n by 1 and determines whether n=0; and
when n=0, said microprocessor outputs a final product;
otherwise said microprocessor returns to said step of loading matrices into matrix column and row banks via said data transfer controller.

2. A matrix multiplication co-processor for multiplying a first n-column matrix by a second n-row matrix, wherein is an integer number denoting the number of columns of said first matrix and the number of rows of said second matrix, comprising:
  a microprocessor;
  a data transfer controller;
  a plurality of random access memory (RAM) banks, said plurality further comprising first matrix row banks, second matrix column banks, and a matrix product bank;
  a plurality of matrix multipliers; and
  a plurality of matrix adders;
  wherein said microprocessor loads data from its RAM into said data transfer controller; and
  wherein said data transfer controller:
    loads each column of said first matrix into said first matrix row bank;
    loads each row of said second matrix into said second matrix column bank;
    reads data out of said first matrix row bank and said second matrix column bank and inputs said data in parallel into said plurality of matrix multipliers;
    wherein said data out of said first matrix row bank and said second matrix column bank are sequentially multiplied together and sequentially input into said plurality of matrix adders and wherein said inputs to said plurality of matrix adders are summed; and
    loads each term of said plurality of matrix adders into said product matrix bank.

3. The apparatus of claim 2, wherein for each of said n data elements said microprocessor reads out of said first matrix row bank, said microprocessor reads out all n data elements from said second matrix column bank.

4. The apparatus of claim 3, further comprising holding each of the n first matrix row bank addresses of said first matrix row bank for n clock cycles while said second matrix column bank counts through all n column bank addresses.

5. A scalable matrix multiplication co-processor having a scaling factor of m for multiplying a first n-column matrix by a second n-row matrix, wherein n is an integer number denoting the number of columns of said first matrix and the number of rows of said second matrix, and wherein in is an integer number predetermined as the scaling factor desired, comprising:
  a microprocessor;
  a data transfer controller;
  a plurality of random access memory (RAM) banks, said plurality further comprising first matrix row banks, second matrix column banks, and a matrix product bank;
  a data transfer controller, wherein said data transfer controller loads data from said microprocessor to said plurality of random access memory (RAM) banks;
  a plurality of matrix multipliers;
  a plurality of matrix adders; and
  a delay register;
  wherein said microprocessor
    sets a counter=m
    sequentially loads n/m elements of each column of said first matrix into said first matrix row bank;
    sequentially loads n/m elements of each row of said second matrix into said second matrix column bank;
    sequentially inputs the outputs of said first matrix row bank and said second matrix column bank into said plurality of matrix multipliers to form a sub product;
    sequentially inputs said sub product into said delay register and delays said sub product by value of said counter;
    decrements said counter by 1;
    sequentially adds said each said delayed sub product to said product matrix bank so as to form a product matrix; and
    returns to sequentially loading the next win elements of each column of said first matrix and the next min elements of each row of said second matrix when said counter>0.

* * * * *